United States Patent [19]

Aricha

[11] Patent Number: 4,729,543
[45] Date of Patent: Mar. 8, 1988

[54] VALVE

[75] Inventor: Yoel Aricha, Ashdod, Israel

[73] Assignee: Shaham Y. Aricha & Sons Limited, Ashdod, Israel

[21] Appl. No.: 891,340

[22] Filed: Jul. 31, 1986

[30] Foreign Application Priority Data

Aug. 1, 1985 [IL] Israel .................................. 75996

[51] Int. Cl.⁴ ............................................ F16K 47/00
[52] U.S. Cl. .................................. 251/121; 251/322; 251/335.1; 137/454.2
[58] Field of Search ................... 137/454.6, 454.2; 251/121, 322, 291, 335.1

[56] References Cited

U.S. PATENT DOCUMENTS

| 1,856,664 | 5/1932 | Steen | 137/454.6 |
| 2,159,452 | 5/1939 | Samaras | 137/454.6 |
| 2,676,610 | 4/1954 | Hare | 137/454.6 |
| 2,841,443 | 7/1958 | Seaquist | 251/291 |
| 2,873,083 | 2/1959 | Rimsha | 251/121 |
| 3,220,695 | 11/1965 | Downey | 251/322 X |
| 3,389,717 | 6/1968 | Pouulski | 251/121 X |
| 3,645,289 | 2/1972 | Schmitt | 137/454.2 |
| 4,151,979 | 5/1979 | Visalli | 251/322 |
| 4,156,519 | 5/1979 | Janz | 137/454.6 X |
| 4,313,466 | 2/1982 | Adams | 137/454.6 X |

Primary Examiner—Harold W. Weakley
Attorney, Agent, or Firm—Finnegan, Henderson, Farabow, Garrett & Dunner

[57] ABSTRACT

A fluid-supply valve comprises a fluid inlet passage; an intermediate fluid chamber of greater volume than this passage; an fluid outlet from the chamber; and a device for closing off the inlet passage which is selectively adaptable to operate in one of two modes, namely, a first mode in which the inlet is closed off by virtue of the fluid pressure of the supply system acting against the device and a second mode in which the the inlet is opened for the passage of fluid sequentially therethrough and through the intermediate chamber and the fluid outlet by virtue of user pressure exerted via the device and against the fluid pressure. The valve may be incorporated in a public drinking fountain in which the user activated mechanism is remote from and sealed from the passages through which the fluid flows.

3 Claims, 9 Drawing Figures

FIG 1B   FIG 1A   FIG 1C   FIG 1D

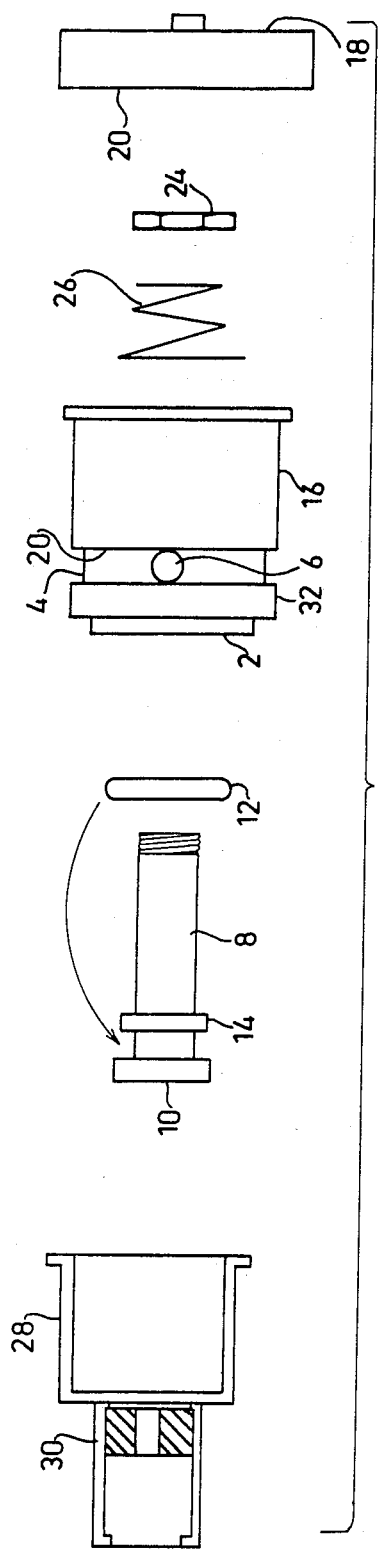
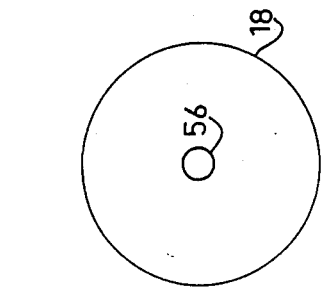
FIG ID
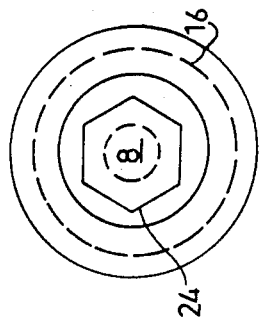
FIG IC
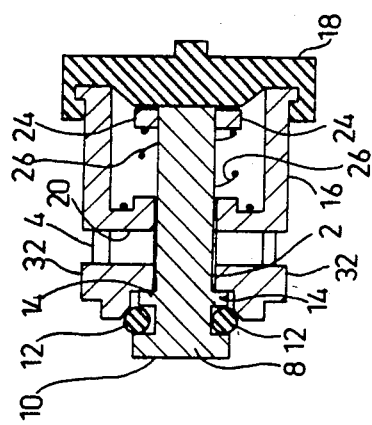
FIG IA
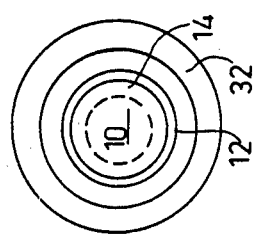
FIG IB

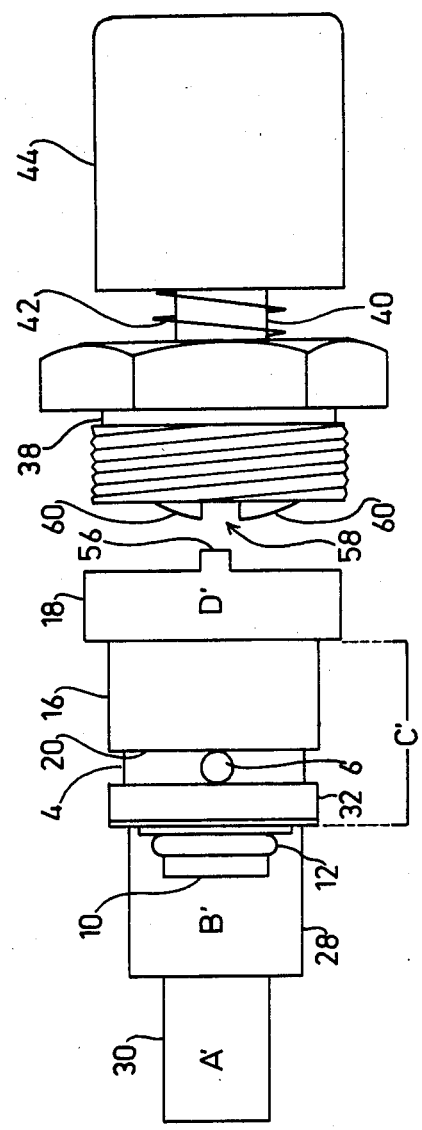
FIG III

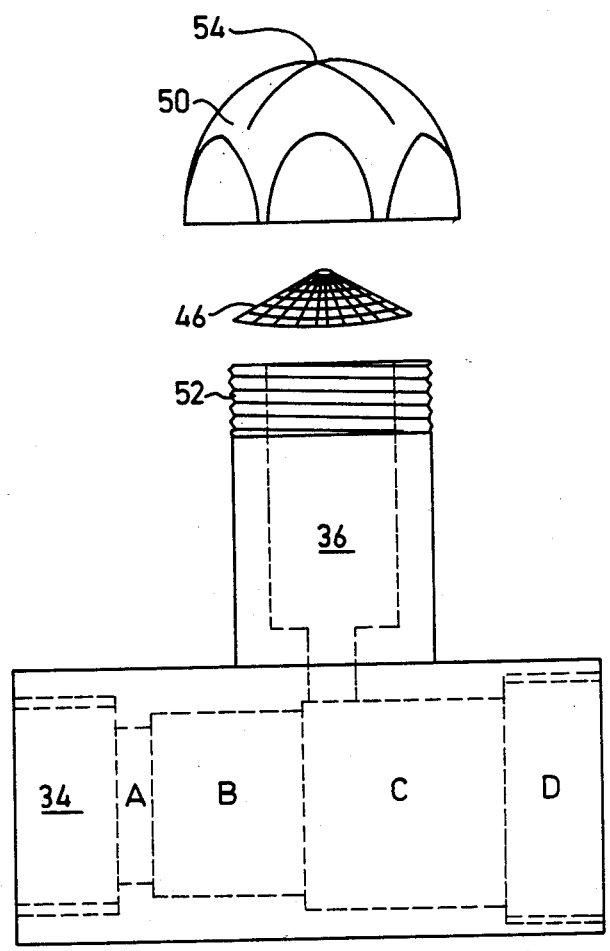
FIG IVA

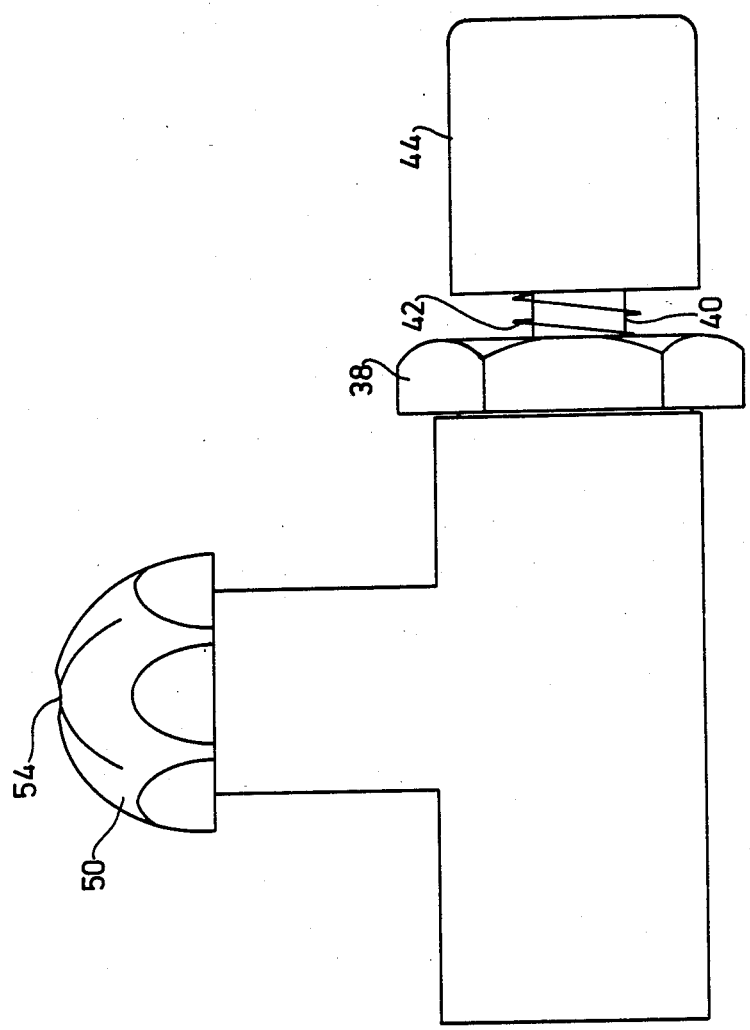
FIG IVB

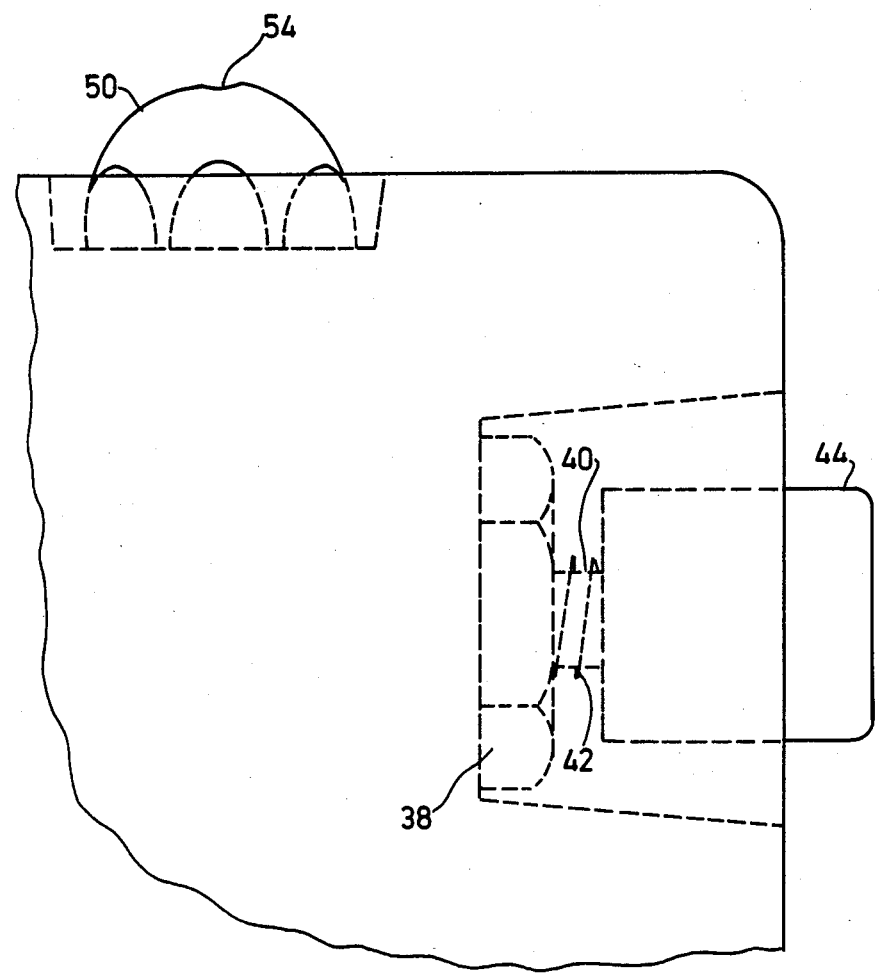
FIG IVC

VALVE

FIELD OF THE INVENTION

The present invention relates to a fluid supply valve as well as to a fluid flow control mechanism embodying this valve.

BACKGROUND OF THE INVENTION

Many such valves and mechanisms suffer the disadvantage that the member operated upon by the user to actuate the system is in proximity to the passages of flow of the fluid, with the consequence that, in case of leakage of fluid, the user will be put at least to some inconvenience, and, depending on the nature of the fluid, even in some danger.

It is accordingly a general object of the invention to provide a fluid-supply valve and a fluid flow control mechanism embodying it, whereby the member operated upon by the user is remote from and insulated from the passages through which the fluid flows.

It is a further object of the invention to provide a public drinking fountain incorporating the valve and mechanism referred to above.

Other objects of the invention will appear from the description which follows.

SUMMARY OF THE INVENTION

The invention accordingly provides a fluid-supply valve comprising:

a fluid inlet passage;

an intermediate fluid chamber of greater volume than this passage;

an fluid outlet from the chamber; and a device for closing off the inlet passage which is selectively adaptable to operate in one of two modes, namely, a first mode in which the inlet is closed off by virtue of the fluid pressure of the supply system acting against the device and a second mode in which the the inlet is opened for the passage of fluid sequentially therethrough and through the intermediate chamber and the fluid outlet by virtue of user pressure exerted via the device and against the fluid pressure.

The fluid inlet passage may have the shape of, for example, the peripheral space between two concentric right prisms, the shapes of which are each preferably selected from the group consisting of cylinders and regular polygonal prisms. Moreover, the fluid inlet passage is in one embodiment defined by the centrally-located void in a disc-like member having its plane disposed perpendicularly to the longitudinal axes of the prisms.

Further, the intermediate chamber may also have the shape of the peripheral space between two concentric right prisms, the shapes of which are preferably each selected from the group consisting of cylinders and regular polygonal prisms.

The fluid outlet may comprise one or more holes pierced in the periphery defined at the outer surface of the outer prism which defines the outer peripheral limit of the intermediate chamber.

The closing-off device may comprise an elongate plug-like body having the shape of a right prism for the major part of its length and which is adapted to fit the inlet passage in the first mode. Preferably, this body has a larger cross-sectional area at the end receiving pressure from the fluid supply than the cross-sectional area of the major part of its length.

The closing-off of the fluid supply in the first mode is effected by a rubber or plastic gasket supported around the periphery of the elongate plug-like body and located next that part of it having the larger cross-sectional area. Preferably, the elongate plug-like body is provided with an integral raised portion around its periphery and is located immediately next to the gasket whereby the latter is seated between the part of the body having the larger cross-sectional area and the raised portion just referred to.

The fluid-supply valve preferably includes also a first housing adjacent the intermediate chamber and remote from the fluid inlet passage, which first housing has the following characteristics, namely, (i) it does not form part of the passage for fluid through the valve; (ii) it forms a receptacle for the plug-like body at the end remote from the end receiving pressure from the fluid supply; and (iii) it is sealed at the end remote from the intermediate chamber by an elastic disc-like seal for the first housing. Preferably, this first housing defines at the end remote from the seal, one face of the intermediate chamber.

In a particular embodiment of the valve of the invention, the elongate plug-like body is of such a length and the seal is of such a thickness, that in the first mode of operation of the sealing device the end of the body remote from the end receiving pressure from the fluid supply rests against the face of the seal inside the first housing.

It is preferred that the end of the body remote from the end receiving pressure from the fluid supply is provided with a disc-like device of greater cross-sectional area than the body, so that the latter is retained within the first housing in the eventuality that the fluid-supply system develops a vacuum.

It is convenient in practice that the first housing contains also a spring wound around that part of the body situated therein, one end of the spring resting against the disc-like retaining device and the other end of the spring resting against the inside of that part of the first housing located next to the intermediate chamber, in order to bias the body against said seal, regardless of the pressure of the fluid supply. Preferably, the retaining device comprises a screw thread at the end of the body and a cooperative retaining nut.

In a particular embodiment, the valve comprises also a second housing, namely a housing for the end of the body having the larger cross-sectional area, the gasket and the raised portion, this second housing providing also a passage for fluid between the fluid supply and the fluid inlet passage. It is preferred that the valve comprises further a fluid regulator of known construction per se, located between the fluid supply and the second housing.

For practical purposes, it is convenient that the following components of the valve numbered (1) to (4) are constructed with each component of higher number having a relatively greater general cross-sectional area, whereby the valve as a whole may be fitted into a pre-shaped receptacle having four compartments of adequately corresponding cross-sectional area, shape and volume, namely: (1) the fluid regulator; (2) the second housing; (3) the disc-like member, the intermediate chamber and the first housing; and (4) the seal.

In another aspect, the invention also provides a fluid flow control mechanism comprising:

a supply of fluid under pressure;

fluid inlet and outlet conduit apparatus;

a fluid supply valve as described above but which at least comprises the first housing having the enumerated characteristics (i), (ii) and (iii);

receptacle for the valve whereby the valve is so disposed therein as to enable fluid to pass sequentially into the mechanism through the fluid inlet conduit apparatus, through the valve, and out from the mechanism through the fluid outlet conduit apparatus;

device for securing the valve within the receptacle; and apparatus for actuating the valve.

It is preferred that the longitudinal axis of the fluid conduit inlet apparatus is either parallel with or coincident with that of the fluid inlet passage of the valve, and that the longitudinal axis of the fluid conduit outlet apparatus is perpendicularly disposed with respect to that of the fluid conduit inlet apparatus.

The securing device may comprise an at least partly peripherally threaded outer compartment of the receptacle together with a cooperatively threaded bolt. The latter preferably comprises a hollow core, which may be occupied by an actuation mechanism for the valve adapted to exert pressure on the seal and on the body, thereby to enable operation of the valve. It is preferred that the actuation mechanism be adapted to exert pressure on the seal and on the body in a direction along the longitudinal axis of the latter.

As will be evident, the actuation mechanism may be operated in any convenient manner. For example, it may be operated by use of a threaded tap-like member whereby the pressure on the seal may be progressively increased or decreased. Alternatively, it may be operated by use of an unthreaded tap-like member whereby the pressure on the seal may be increased or decreased in one step or in a series of incremental steps.

Preferably, however, the actuation mechanism is operated by use of a spring-loaded pressure-responsive member whereby the pressure on the seal may be progressively increased by user-pressure exerted against the member or decreased by the release of such user-pressure. Particularly in the case of this type of actuation mechanism, it is preferred that the seal comprises a central integral projection at the face remote from the elongate plug-like body, which projection seats in a corresponding hollow in that part of the pressure-responsive member located adjacent to the seal.

In a preferred embodiment, the fluid flow control mechanism comprises the fluid supply valve of the invention as described above, in which certain components were ascribed numbers (1) to (4), in which case the receptacle is pre-shaped and has four compartments of adequately corresponding cross-sectional area, shape and volume, for the four numbered components of the valve.

The fluid flow control mechanism preferably comprises also a filter for the fluid in the inlet and/or outlet conduit apparatus.

The particular advantage of the present invention is that the means by which the valve or the fluid flow mechanism embodying it are actuated by the user is remote from and sealed from the passages through which the fluid flows. This means that in the event that fluid does leak from the system, the user will be insulated from the leak, which is a great advantage in terms of convenience and safety. It will be apparent, therefore, that such a valve and fluid flow mechanism embodying it will have many applications, and is by no means to be limited to the particular embodiment illustrated herein.

Thus, the invention may be adapted to handle gases or liquids. The fluids may be for example, those to be used in chemical processes, or those used to convey the products of such processes. It is evident that a person possessing average skill in the art would be capable of attaching a meter to measure the quantity of fluid passing through the valve of the invention, where this is required or necessary for a particular application.

In a particular application of the invention, the valve or fluid flow mechanism may be adapted for a water supply, e.g. such a supply intended for human consumption.

The invention accordingly provides in yet a further aspect, a public drinking fountain embodying the fluid-supply valve, and more particularly the fluid flow control mechanism, in accordance with the invention.

BRIEF DESCRIPTION OF THE DRAWINGS

FIG. IA is a sectional side-view illustration of the fluid-supply valve of the invention.

FIG. IB is a schematic end-view of the valve of FIG. IA, seen from the left-hand side.

FIG. IC is a schematic end-view of the valve of FIG. IA, seen from the right-hand side, with the seal removed.

FIG. ID is a schematic end-view of the valve of FIG. IA, seen from the right-hand side, with the seal attached.

FIG. II is an exploded view of the valve of the invention, including certain optional components.

FIG. III is a pictorial view of the valve of the invention and shows also one form of actuation apparatus.

FIG. IVA is a mainly sectional illustration of the shell of a fluid flow control mechanism of the invention to be used in a public drinking fountain.

FIG. IVB is an exterior view of the fluid flow control mechanism of the invention and assembled from the components illustrated in FIGS. III and IVA.

FIG. IVC is a partly sectional illustration of the mechanism of FIG. IVB which has been set into a public drinking fountain.

DETAILED DESCRIPTION OF THE INVENTION

In the Figures, specific items are designated throughout by the same reference numerals. In the fluid-supply valve, there are shown a cylindrically-shaped the fluid inlet passage 2, an also cylindrically-shaped intermediate fluid chamber 4 and a closing-off device for the inlet passage (see below) which is selectively adaptable to operate in one of two modes, namely, a first mode in which the inlet is closed-off by virtue of the fluid pressure of the supply system acting against the device (as shown) and a second mode (not shown) in which the the inlet is opened for the passage of fluid sequentially therethrough and through the intermediate chamber and the fluid outlet by virtue of user pressure exerted via the device and against the fluid pressure.

The fluid outlet comprises a hole 6 pierced in the periphery defined at the outer surface of the hollow cylinder defining the outer peripheral limit of intermediate chamber 4.

The closing-off device comprises a cylindrical plug-like body 8 and is adapted to slidably fit the inlet passage in the first mode. It is seen that body 8 at the end 10 which receives pressure from the fluid supply has a cross-sectional area which is greater than that of the major part of its length.

The fluid supply is closed off from the fluid inlet 2 (in the first mode) by a rubber or plastic gasket 12 supported around the periphery of body 8; the latter is provided with an integral raised portion 14 around its periphery, whereby the gasket is seated between end 10 and raised portion 14. End 10 of body 8, gasket 12 and raised portion 14 are, in the first mode, supported against disc-like member 32 adjacent one end of intermediate chamber 4.

Adjacent the other end of intermediate chamber 4 is first housing 16. It is to be noted that 16 does not form part of the passage for fluid through the valve; it forms a receptacle for body 8; and it is sealed at the end remote from intermediate chamber 4 by an elastic disc-like seal 18. Housing 16 defines at its end wall 20 remote from seal 18, one face of the intermediate chamber.

In the illustrated embodiment, body 8 is of such a length and seal 18 is of such a thickness, that (in the first mode, as shown) the end of body 8 remote from end 10 rests against the face of seal 18 inside housing 16. In order to retain body 8 inside housing 16, in the eventuality that the fluid-supply system develops a vacuum, the end of body 8 remote from end 10 is provided with a screw thread and a cooperative retaining nut 24. Housing 16 contains also a spring 26 wound around that part of body 8 situated therein, one end of spring 26 resting against nut 24 and the other end of 26 resting against the inside of end wall 20 of housing 16, in order to bias the body against said seal, regardless of the pressure of the fluid supply.

A second housing 28 is provided for end 10 (including gasket 12 and raised portion 14) of body 8, second housing 28 providing also a passage for fluid between the fluid supply and the fluid inlet passage. As shown, the valve comprises further a fluid regulator 30, as known for example from the irrigation art, which has the effect of supplying fluid at substantially constant pressure to the valve, regardless of the variation of the pressure at source.

As shown more especially in FIG. III, the following components of the valve are constructed with each later-mentioned component having a relatively greater general cross-sectional area, whereby the valve as a whole and the respectively stated components (identified below as A', B', C', D') may be fitted into the pre-shaped receptacle shown in FIG. IVA having respectively four compartments (A), (B), (C) and (D) of adequately corresponding cross-sectional area, shape and volume, namely: the fluid regulator 30 (A'); the second housing 28 (B'); the disc-like member 32, the intermediate chamber 4 and the first housing 16 (C'); and the seal 18 (D').

The fluid flow control mechanism of the invention as illustrated in FIG. IVA taken in conjunction with FIG. III comprises a supply of fluid under pressure (not shown); fluid inlet 34 and outlet 36 conduit apparatus; the fluid supply valve as described above, more especially with reference to FIG. III; receptacle for the valve comprised of compartments (A), (B), (C), (D), wherein the valve is so placed that fluid is enabled to pass via the valve, from 34 to 36; a device for securing the valve within the receptacle which comprises peripherally threaded outer compartment (D) of the receptacle together with a cooperatively threaded bolt 38; and actuation mechanism 40 which is operated by use of a spring 42 loaded pressure-responsive member 44 whereby, as can be seen from the illustration, the pressure on the seal may be progressively increased by user pressure exerted against the member, or decreased by the release of such user pressure. The apparatus also includes stainless steel filter 46 at the top of outlet conduit 36, as well as mushroom-shaped cap 50 which screws onto the end of 36 at thread 52.

In the embodiment illustrated, seal 18 comprises a central integral cylindrical projection 56 on its outer face, which seats in a similarly shaped hollow 58 in that part 60 of member 40 which is located adjacent to seal 18.

When the mechanism is operated from the illustrated first mode [body 8 being in a rest position] by pushing pressure-responsive member 44 in a horizontal leftwards direction, actuation member 40 pushes through the hollow central portion of bolt 38 against the centre of elastic seal 18, and this motion is transmitted to body 8, thus allowing fluid (e.g. water) to pass through compartments A', B', C' [via inlet passage 2, intermediate chamber 4, fluid outlet 6], outlet conduit 36, filter 46 and cap 50, and issue to the consumer at orifice 54. On releasing the pressure on 44, body 8 resumes its first (illustrated) mode, and with the valve closed, fluid (e.g. water) ceases to issue at 54.

FIG. IVB shows an exterior view of the fluid flow control mechanism of FIG. IVA as assembled. FIG. IVC shows the same mechanism set into a public drinking fountain, with little more than operative pressure-sensitive member 44, part of cap 50, and orifice 54, visible on the exterior.

It will be appreciated by persons skilled in the art that many variations and modifications may be made in the particular embodiment of the invention just described. For example, to mention just one possible variation, it will be evident that while in the illustrated embodiment, the closing-off device is shown as a generally cylindrical plug fitted in a cylindrical aperture, this device and aperture could otherwise take the shape of a regular right pentagonal or hexagonal prism.

Thus, the present invention is not limited to what has been shown and described hereinabove. Rather the scope of the present invention is defined only by the claims which follow.

I claim:

1. A public drinking water fountain including a fluid supply valve for pressurized water which comprises:
   a cylindrically shaped fluid chamber having first and second ends, a peripheral wall and an interior portion, said first end having formed therein a cylindrical fluid inlet passage and said peripheral wall having formed therein a fluid outlet passage;
   a cylindrical housing having first and second ends and an interior portion, said first end being flanged and said second end being located adjacent said second end of said fluid chamber;
   means for governing the flow of water through said fluid chamber comprising a spring wound elongated actuation member which defines a recess at one end;
   an elastic disk-like seal which engages the flange of said cylindrical housing and which is configured to define a central integral cylindrical projection on its exterior face, said seal being operative to prevent flow of water from said cylindrical housing to said actuation member; and a cylindrical plug-like body having first and second ends, and being adapted to slidably fit the inlet passage of the fluid chamber, said plug-like body traversing the interior of the fluid chamber and the interior of the cylindrical housing such that first end of the plug-like body rests against the interior face of the disk-like seal, said recess in said actuation member being operative for engaging the central integral projection of the disk-like seal, whereby displacement of the actuation member is transmitted to the disk-like seal, which transmits the displacement to the plug like body thereby causing it to slide in a transverse fashion in the fluid chamber thereby allowing fluid to flow through the chamber and out through the fluid outlet passage.

2. A water fountain according to claim 1 and also comprising:
   a screw thread at the first end of the plug-like body;
   a retaining nut having first and second ends, said retaining nut attached to said screw thread; and
   a spring would about the plug-like body, said spring located adjacent first end of the retaining nut and thereby biasing the plug-like body to remain adjacent the disk-like seal regardless of the pressure of the fluid supply.

3. A water fountain according to 1 and also comprising a fluid regulator for supplying water at a substantially constant pressure to the valve regardless of the variation of the pressure at the source.

* * * * *